(No Model.) 6 Sheets—Sheet 1.

R. W. ARCHER.
BALING PRESS.

No. 380,472. Patented Apr. 3, 1888.

ATTEST.
J. Henry Kaiser.
A. M. Paxton.

INVENTOR.
Roger W. Archer
By F. L. Browne
Attorney.

(No Model.) 6 Sheets—Sheet 3.
R. W. ARCHER.
BALING PRESS.

No. 380,472. Patented Apr. 3, 1888.

(No Model.) 6 Sheets—Sheet 4.
R. W. ARCHER.
BALING PRESS.
No. 380,472. Patented Apr. 3, 1888.
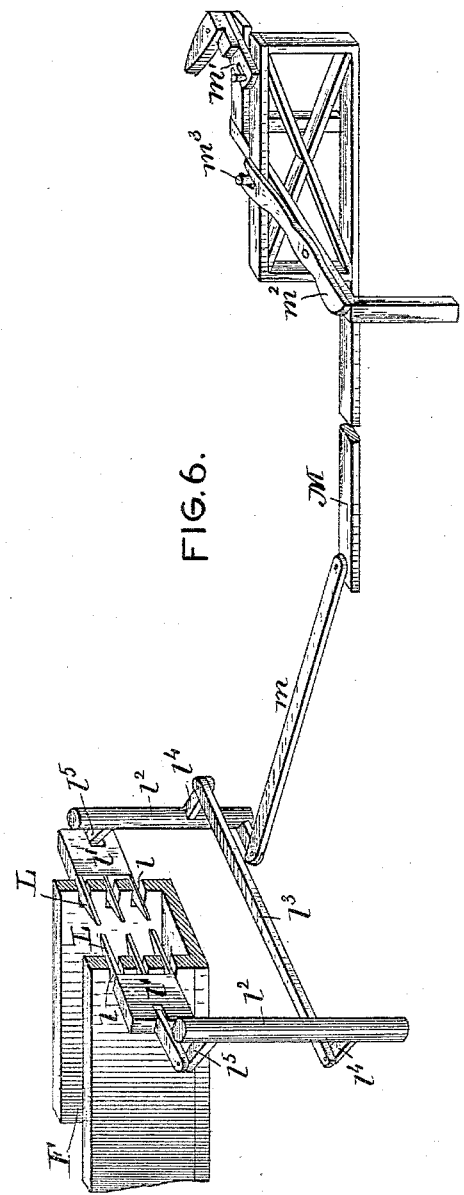
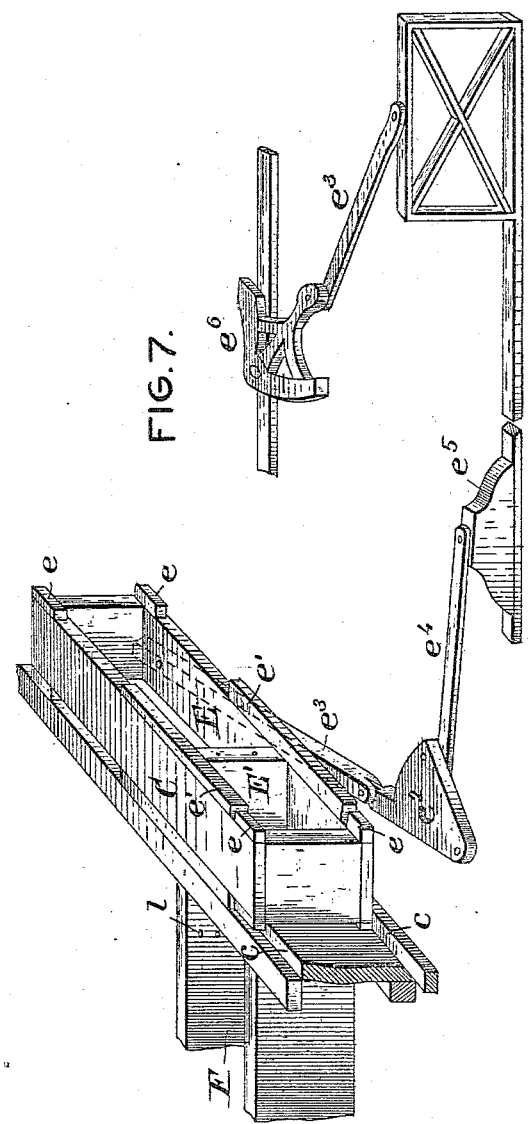
ATTEST.
J. Henry Kaiser.
A. M. Paxton
INVENTOR.
Roger W. Archer
By J. L. Browne
Attorney.

(No Model.)  R. W. ARCHER.  6 Sheets—Sheet 5.
BALING PRESS.
No. 380,472.  Patented Apr. 3, 1888.
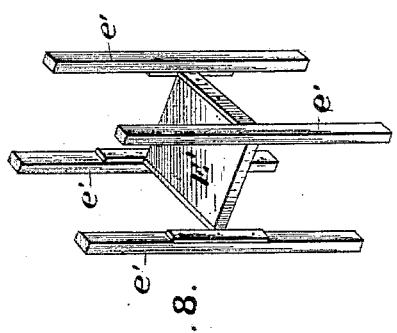
FIG. 8.
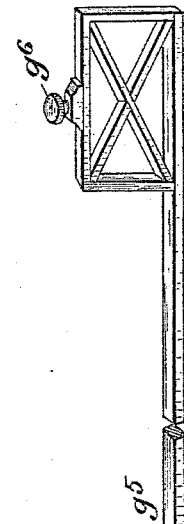
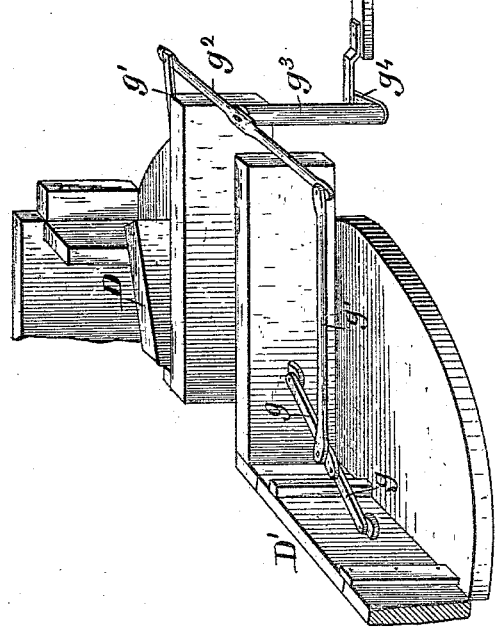
FIG. 9.
ATTEST:  INVENTOR.
J. Henry Kaiser  Roger W. Archer
A. M. Paxton  By F. L. Browne
  Attorney (No Model.) 6 Sheets—Sheet 6.

R. W. ARCHER.
BALING PRESS.

No. 380,472. Patented Apr. 3, 1888.

ATTEST.
J. Henry Kaiser
A. M. Paxton

INVENTOR.
Roger W. Archer
By F. L. Browne
Attorney

UNITED STATES PATENT OFFICE.

ROGER W. ARCHER, OF BEEVILLE, TEXAS, ASSIGNOR OF ONE-THIRD TO CALVIN F. RUDOLPH, OF SAME PLACE.

BALING-PRESS.

SPECIFICATION forming part of Letters Patent No. 380,472, dated April 3, 1888.

Application filed September 14, 1887. Serial No. 249,637. (No model.)

*To all whom it may concern:*

Be it known that I, ROGER W. ARCHER, a citizen of the United States, residing at Beeville, in the county of Bee and State of Texas, have invented certain new and useful Improvements in Baling-Presses; and I do hereby declare the following to be a full, clear, and exact description of the invention, such as will enable others skilled in the art to which it appertains to make and use the same.

Figure 1:
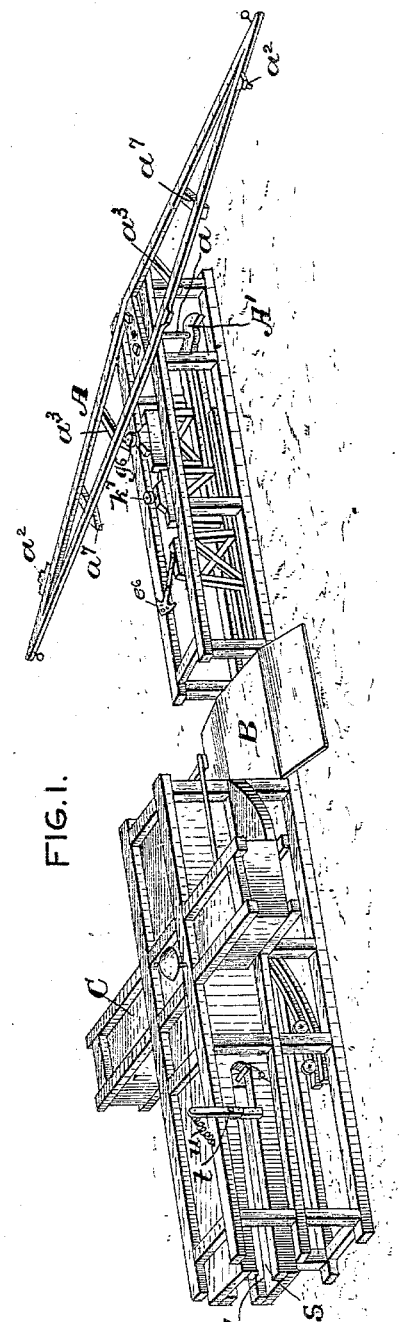
Figure 2:
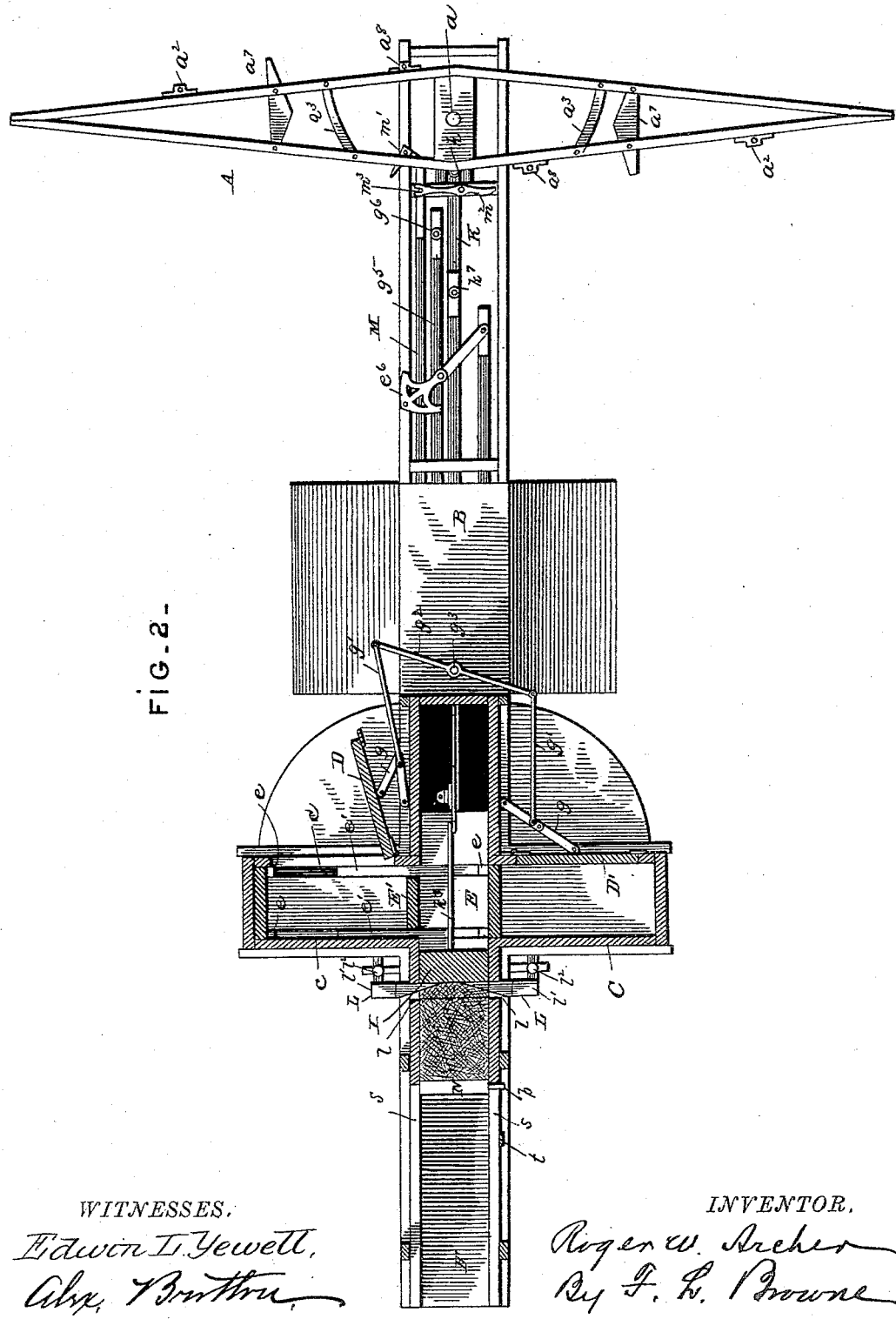
Figure 3:
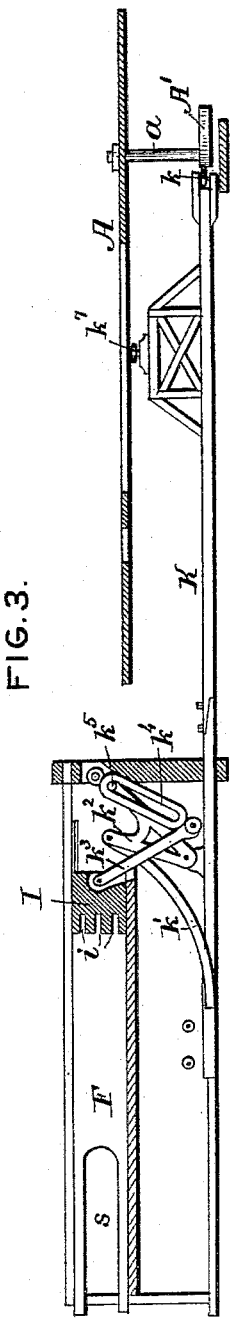
Figure 4:
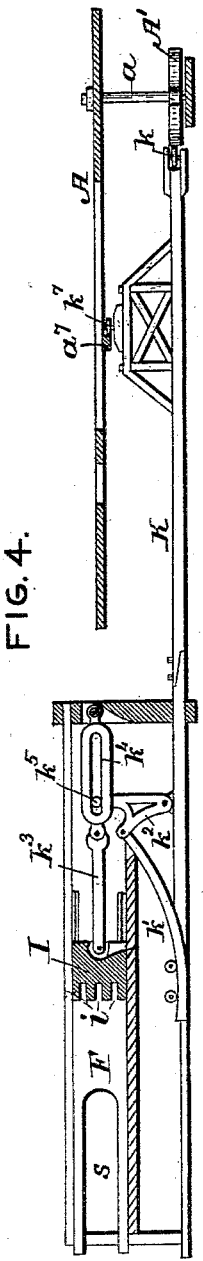
Figure 5:
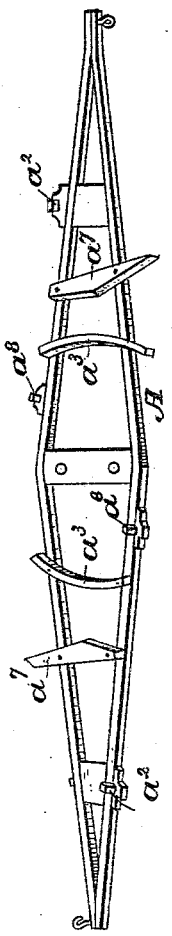
Figure 11:
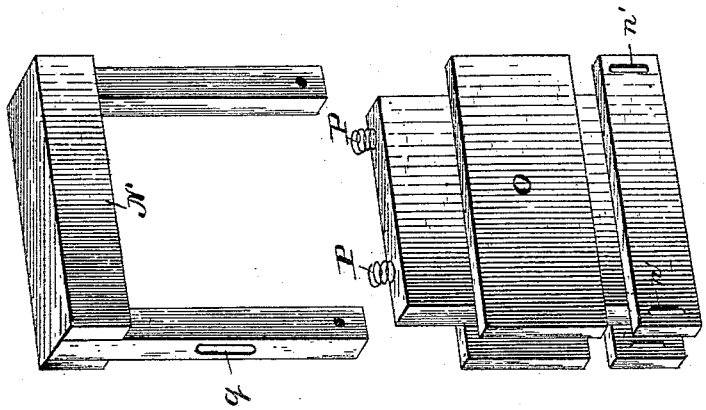
Figure 10:
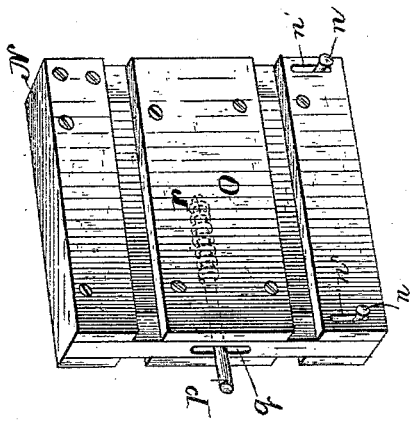

In the accompanying drawings, illustrating my invention, Figure 1 is a perspective view of the entire press. Fig. 2 is a plan view with a portion of the feed-box and baling-chamber in horizontal section. Fig. 3 is a side elevation, partly in section, of the mechanism for operating the plunger, the latter being shown in its retracted position. Fig. 4 is a similar view showing the plunger extended in the act of compression. Fig. 5 is a bottom view of the horse-power sweep. Fig. 6 is a detail view of the mechanism for operating the needles for confining the charge in the baling-chamber. Fig. 7 is a detail perspective view of the movable double feed-box. Fig. 8 is a detail view of the movable partition for the feed-box. Fig. 9 is a view of mechanism for operating the doors of the feed-box. Fig. 10 is a separate view of a self-adjusting division-plate for separating the finished bales. Fig. 11 shows the construction of the same.

The frame-work of my baling-press is preferably composed of two parts, the one supporting the charging and compressing chambers and the other containing the horse-power and the system of levers which transmits the power to the various operative parts of the press. For convenience in transportation, I prefer to make these two separate structures, which may be bolted together when in operation, but may be separated and independently mounted upon carrying-wheels in transportation.

The horse-power sweep A is a lever pivoted centrally upon the frame-work by means of a vertical shaft, *a*. The lever, if composed, as shown, of a skeleton frame-work, is suitably braced and supported, and is provided at each end with means for the attachment of one or more horses. The movement of the lever is continuously circular, and therefore a gangway is provided across the bed-frame of the machine, as shown at B, for the passage of the horses.

The sweep A is provided with means for automatically and in proper time operating four distinct series of mechanism necessary to the proper working of my press. First, mechanism for controlling the doors of what I term the "movable feed-box;" second, mechanism for sliding the feed-box itself so as to bring each charge in position to be compressed; third, mechanism for operating and retracting the compressing-plunger, and, fourth, means for operating a series of needles for confining a charge in position after compression. I shall proceed to describe these various systems of mechanism separately, and shall afterward describe the continuous automatic operation of the entire press.

What I term a "double-sliding feed-box" is inclosed by a closed rectangular frame, C, placed at right angles to and supported by the main frame of the machine, beyond which it extends on both sides, as shown in Fig. 1, far enough to allow room for a feed-door, D, Fig. 9, on each side, each of which doors close a feed-opening in the side frame. The construction of these doors and the manner of operating them will be hereinafter explained. The sliding feed-box E, Fig. 7, is supported by ways *c c* of the frame C, and is entirely open at the front, so that, according to its position, it may communicate either with the central baling-chamber, F, or with either of the feed-doors D or D'. The object of this construction is to permit the feed-box to receive a charge of material (hay, for instance) through one of the feed-doors. It is then moved over far enough to bring the charge into the baling-chamber and in line with the compressing-plunger, and then still farther moved to bring the other end in line with the other feed-door, thus sliding back and forth transversely and receiving the material alternately at each movement.

An independent sliding partition, E', Figs. 7 and 8, is secured centrally to four guides, *e'*, and is mounted upon the same ways, *c c*, that support the feed-box. This partition forms a temporary inner end wall for that portion of the feed-box which receives a charge, and during the operation of charging the box remains stationary. When the box has commenced its movement, the guides $e'$ are struck by a series of projections, $e$, on the corners of the feed-box, causing the partition to be shifted over in position to perform a similar office for the other end of the said feed-box.

The feed-box is operated from the horse-power sweep by a system of levers and connections. (Shown in Fig. 7.) A triangular plate, $e^2$, is pivoted at its apex to the bed-frame and at one corner to a connecting-rod, $e^3$, which is in turn pivoted to the bottom of the feed-box. The other corner is connected by a similar rod, $e^4$, to an extension of a sliding frame, $e^5$, which is connected to a pivoted cam, $e^6$, on the forward part of the main frame. This cam is struck by a projection, $a^2$, of the sweep which operates the whole system of levers and connections just described. There are two of such projections $a^2$, one near each end of the sweep, so that the box is caused to slide twice at each revolution of the latter.

The feed-doors D D′, Fig. 9, are hinged one on each side of the baling-chamber to the front of the frame E. They are operated simultaneously, the movement required to open door D closing and locking the door D′. A toggle, $g$, is connected to the door and to the side of the baling-chamber, and to the joint of which toggle is pivoted an arm, $g'$. These arms $g'$ are pivoted to a cross-piece, $g^2$, secured rigidly to a standard, $g^3$, having a crank, $g^4$. To this crank is connected a sliding frame, $g^5$, carrying a roller, $g^6$. This roller is struck by two cams, $a^3$ $a^3$, on the sweep A, each stroke causing one door to open and the other to close, the closed door being locked by the toggle-joint when the latter is straightened out, as in Fig. 9.

The movements of the feed-doors and feed-box are so timed that the door D is opened when the box has reached the limit of its movement upon that side of the machine, and is ready to receive a charge of material, while the door D′ remains closed until that particular charge has been brought in line with the baling-chamber and the box has been moved over to the opposite side, ready to receive a second charge.

The baling-chamber F extends from the gangway to the rear or discharge end of the machine, its diameter being gradually contracted toward the rear to aid in the compression of the bales.

In the baling-chamber reciprocates the plunger I, which is a solid block fitting the chamber closely and having formed in its face a series of horizontal slots, $i$, Figs. 3 and 4. The figures last mentioned show the plunger at the two extremes of its movement, and clearly illustrate the peculiar link-motion by which a powerful compressing force is imparted to it. The movement of this plunger is derived from the power-sweep A by means of a double cam, A′, keyed to the shaft $a$ just above the bed of the machine. The arms of this cam as the sweep revolves bear upon a friction-roller, $k$, on the main plunger-rod K, the latter being jointed, as shown, for convenience in transportation.

The rear end of the rod K projects back some distance into the space below the baling-chamber, Figs. 3 and 4, and is there connected to one of a series of arms and links by which its movement is communicated to the plunger. This arm $k'$ is connected by means of an arm, $k^2$, to a toggle composed of a rod, $k^3$, hinged directly to the plunger, and a slotted link, $k^4$, pivoted to said rod and hinged within a recess in the front end of the baling-chamber, the bottom of said recess being beveled to allow the link to assume the position shown in Fig. 3. The arm $k^2$ is pivoted to the plunger-rod K, and has a pin, $k^5$, which slides in the slotted link. The movement of the toggle is therefore controlled by the swinging arm $k^2$, and this movement results in a stroke gradually increasing in power as the arms of the toggle are straightened into the position shown in Fig. 4. The plunger-rod is retracted twice at each revolution of the sweep by cams $a^7$ $a^7$, bearing on a roller, $k^7$, suitably journaled on the said rod. It will thus be seen that at each revolution of the sweep two charges, one from each side of the feed-box, are compressed by the plunger.

In order to retain the charge just compressed in position and prevent any backward movement of the material in the baling-chamber, I have provided two series of horizontally-moving needles, L L, which work through slots $l$ in the sides of the baling-chamber, as shown in Figs. 6 and 7. These needles are attached to blocks $l'$ $l'$, connected, as shown, to vertical crank-shafts $l^2$ $l^2$, mounted on the bed of the machine. A simultaneous movement of these crank-shafts is obtained by means of a connecting-rod, $l^3$, hinged to the cranks $l^4$ $l^4$, the blocks themselves being connected to cranks $l^5$ $l^5$. Motion is given to one of these crank-shafts by means of a sliding frame, M, connected to said crank-shaft by a rod, $m$, Fig. 6, which frame is connected to a slotted cam, $m'$, mounted on the forward portion of the frame, which is struck by another cam, $a^8$, on the sweep, which gives it a limited movement, just sufficient to cause the projection of the needles. The retraction of the needles is accomplished by a forked pivoted lever, $m^2$, which engages a pin, $m^3$, on the frame M, and is operated by the same cam on the sweep in the course of its revolution. The needles enter the slots in the face of the plunger when the latter has reached the end of its stroke, and remain in position across the baling-chamber until the plunger has been withdrawn and has come forward again for a fresh charge, when they are retracted during the operation of compressing.

In order to separate the completed bales I have provided a contracting division-plate, which is shown in Figs. 10 and 11. This plate is composed of two parts, N and O, sliding upon one another in guides, as shown, and having slots and pins n n' for limiting the motion. One or more springs, P, are inserted between these sliding parts, which tend to force them apart, but permit them to be closed when the plate is exposed to side pressure. The plate is also provided at one side with a rod, p, which is forced outward normally through a slot, q, by a spring, r. When the proper amount of material to form a bale had been forced into the baling-chamber, this division-plate is inserted through either of the end doors into the feed-box, and by the ordinary movement of such box is carried into the baling-chamber, in which it is forced back by the plunger against the material in the chamber. The converging sides of the chamber cause the division-plate to automatically contract as it moves back until it reaches the open slot s, Fig. 1, in the side of the chamber, when the spring r forces the rod p out through said slot. A short lever, t, is pivoted in the path of this pin, which lever is connected by a wire to an alarm or signal placed at any convenient point on the frame. The ringing of this alarm signifies that sufficient material has been fed into the baling-chamber to form a bale. The lever which operates this arm is retracted by a tension-spring, u.

The operation of my press has perhaps been sufficiently indicated in the foregoing description; but I deem it best to broadly describe the same.

It will be understood that the press is operated by a horse or a team of horses hitched to each end of the power-sweep, and that the constant circular movement of said sweep operates all the different parts of the press. It will also be understood that two men are required, one on each side, to charge the feed-boxes alternately.

The machine being ready for work, one of the feed-doors will be open and the other closed. The feed-box is on one side of the machine, so as to receive a charge of material through the open door. As the power-sweep revolves, the feed-door just mentioned is closed and the opposite door opened. Continuing the movement, the sweep retracts the plunger to the position shown in Fig. 3—that is, the front of the feed-box. The sliding frame which actuates the feed-box is next moved by its cam on the sweep, and the feed-box commences its transverse movement, partially compressing the bale sidewise between its end and the movable partition, the space occupied by the material at this time being equal to the diameter of the baling-chamber. The material is brought in line with the baling-chamber just as the double cam strikes the plunger-rod and forces the latter back. This movement of the plunger carries the material into the baling-chamber proper, where it is compressed, the needles being at the proper time projected to hold it in position. The feed-box continues its transverse motion until it registers with the opposite door, now open, when it is ready to receive a charge from that side. It will thus be seen that two complete charges of material, fed alternately from opposite sides, are compressed at each revolution of the sweep, and that every step in the operation of forming a complete bale is performed continuously and automatically without stopping the team or reversing the movement of the power, the only manual labor required being the employment of two men at the feeding-box, one on each side thereof, to throw the material within the doors of such box, and a third man at the discharge end to tie and remove the bales.

It will be understood that, if desired, steam power may be used to operate my press by providing suitable gearing adapted to such power.

I claim—

1. In a baling-press, the combination, with the baling-chamber and the reciprocating plunger, of an automatic transversely-moving feed-box adapted to receive the material alternately at each end and convey it to the baling-chamber, substantially as described.

2. In a baling-press, the combination, with the baling-chamber and the rociprocating plunger, of a transversely-moving feed-box and a pair of automatic feed-doors simultaneously and alternately opened and closed, substantially as described, for the purposes set forth.

3. In a baling-press having a transversely-sliding feed-box, the combination, with said feed-box, of a pair of feed-doors connected together, a power-sweep, and connecting-rods between the power-sweep and the feed-doors, whereby they are operated automatically and simultaneously by the said power-sweep, substantially as described.

4. In a baling-press, the combination, with the power-sweep, having a continuous circular motion, of a feed-box placed transversely to the press, and connections, substantially as described, between the power-sweep and the feed-box, whereby a transverse reciprocating motion of the feed-box is derived from the circular movement of the sweep, substantially as set forth.

5. In a baling-press, the combination, with the transversely-sliding feed-box, of a movable partition adapted to be shifted by the feed-box so as to form a temporary chamber at each end of the feed-box successively, substantially as described.

6. In a baling-press, the combination, with the baling-chamber, the reciprocating plunger working therein, and the power-sweep, of a series of needles or retaining-bars upon each side of said chamber, said series being connected together and to said power-sweep, whereby they are automatically operated by the movement of the latter, substantially as set forth.

7. In a baling-press having feed-openings on opposite sides thereof and a pair of doors for closing such openings, the combination, with said doors, of mechanism for operating them simultaneously, the same consisting of a vertical shaft having a cross-head, a rod connecting the said cross-head to each of said doors, and a sliding frame connected to the said vertical shaft and operated by the power-sweep, whereby one of said doors is opened and the other closed, substantially as described.

8. In a baling-press having a feed opening on each side thereof, the combination of a pair of hinged doors connected to the frame of the press by toggle-joints, a vertical shaft carrying a cross-head connected to said toggles, and a sliding frame for operating said vertical shaft, substantially as described.

9. The division-plate consisting of the grooved block O, in combination with the block N, having tongues sliding in said grooves, and springs P P, interposed between said blocks, substantially as described.

10. In combination with the baling-chamber, a division-plate composed of two sliding blocks having interposed springs, and a spring-actuated rod sliding within said division-plate, substantially as set forth.

In testimony whereof I affix my signature in presence of two witnesses.

ROGER W. ARCHER.

Witnesses:
F. L. BROWNE,
M. A. BALLINGER.